United States Patent Office 3,347,950
Patented Oct. 17, 1967

3,347,950
ADHESIVE COMPOSITION
Louis Robert Mazurk, Glenview, Ill., assignor to The Tapecoat Company, Inc., a corporation of Delaware
No Drawing. Filed Dec. 10, 1962, Ser. No. 243,655
7 Claims. (Cl. 260—737)

This invention relates to an adhesive composition and especially to a waterproof, corrosion resistant, pressure sensitive adhesive for use in bonding pitch base coatings, such as flexible tapes, composed of pitch and plasticized resins.

It has been proposed to provide pitch base coatings for protecting surfaces such as pipes and the like. For example, extruded tapes composed of pitch and plasticized polymers having increased service temperature ranges, are described in my copending application Serial No. 243,633 and Serial No. 243,654, the latter now being U.S. Patent No. 3,230,192, both filed December 10, 1962. These may be used as protective coverings or coatings on pipe lines, discharge pipes from pumping stations and compressor stations, steam lines and the like wherever the usual pitch based coatings may or may not be applicable. However, in applying such coatings, for use over such wide temperature ranges, many of the commonly used pressure sensitive adhesives are not capable of giving satisfactory results because they are subject to deterioration upon aging. This deterioration may be caused by oxidation or microbiological attack. In either case the adhesive qualities are impaired if not destroyed. This condition permits water to seep under the coating, thus causing corrosion.

It is an object of this invention to provide a new and useful pressure sensitive adhesive for pitch base coating compositions which adhesive is waterproof, resistant to microbiological attack and is chemically inert or corrosion resistant in its normal environment or use.

A further object is to provide an adhesive for bonding such a coating to a solid surface, especially where the coating is an extruded tape composed mainly of pitch.

It is another more specific object of this invention to provide such an adhesive composition which utilizes certain readily available components, i.e., chlorinated biphenyl, chlorinated rubber and pitch.

In accordance herewith, I have provided a new adhesive composition which comprises chlorinated biphenyl, chlorinated rubber and pitch or a mixture of pitch and a tackifying resin and which is useful in the coating of pipes and other solid surfaces with pitch base coatings. Advantageously, in accordance herewith, the adhesive composition may contain a major amount of chlorinated biphenyl and minor amounts each of chlorinated rubber and pitch or pitch and a tackifying resin.

Preferably the chlorinated rubber is a high molecular weight chlorinated rubber. The pitch may be any of the well known pitches e.g., coke oven coal tar pitch, blast furnace coal tar pitch, gas producer coal tar pitch, low temperature coal tar pitch, gas works coal tar pitch, etc., and advantageously may have a softening point (ball and ring method) in the range of 130° to 200° F., preferably 160° to 170° F. Chlorinated biphenyl is well known and can be prepared by bringing benzene vapors into contact with a hot metal catalyst followed by chlorination with chlorine using an iron catalyst.

The tackifying agents or tackifying resins may be any of the tackifying resins known to those in the art. For example, the tackifying resin may be chosen from the group of natural resins such as terpene resins and synthetic resins such as the copolymer tackifying resins, e.g. styrene-acrylonitrile copolymers and the like, and including the processed or by-product resins such as the high molecular weight cyclic hydrocarbon resins obtained from the high temperature cracking or petroleum. The preferred tackifying resins are the resins having a cyclic hydrocarbon molecular group within their structure. As a more particular example, a terpene resin such as Staybelite Ester #10, which is a glycerine ester of hydrogenated rosin (usually predominately abietic and similar acids) and which apparently contains the cyclic abietic or hydroabietic structure, may be used. An example of a suitable copolymer tackifying resin is Piccoflex 105, a plasticized styrene-acrylonitrile copolymer manufactured by Pennsylvania Industrial Chemical Company. The cyclic hydrocarbon resins from high temperature cracking may be obtained, for example, under the trade name Piccopale, as manufactured by Pennsylvania Industrial Chemical Company.

As an example of one of the adhesive compositions of this invention, three parts of chlorinated biphenyl (Aroclor 1254), one part of high molecular weight chlorinated natural rubber (Alloprene 125) and one part of pitch having a softening point of 160° F. were thoroughly mixed together providing an adhesive composition which was applied to metal pipe and used to bond thereto an extruded tape composed of 75% pitch (containing a small amount of filler and softening agent) and 25% plasticized polyvinylchloride, prepared by blending three parts polyvinylchloride having a molecular weight of about 50,000 and plasticized with two parts di(2-ethylhexyl)phthalate. The adhesive composition was capable of maintaining a bond over a wide variety of temperature conditions.

In order to test the effectiveness of various adhesives, a series of adhesive compositions were prepared. In each preparation, the adhesive contained 60 weight percent chlorinated biphenyl, 20 weight percent chlorinated rubber and 20 weight percent tackifying resin and/or pitch. In the preparation, the chlorinated biphenyls and tackifying resins and/or pitch were heated together to effect solution. The solution was maintained at about 220° F. while the chlorinated rubber was added with agitation. A high shear mixer may be used. The resulting molten adhesives, at about 220° F., were applied to mild steel plates and evaluated with respect to tensile strength in accordance with the following procedure:

Test procedure

Tensile strength was determined at ambient temperatures by loading a brass cylinder in contact with the adhesives. A load of 500 gms. was applied for 20 minutes. The area of the cylinder in contact with the adhesive was 0.11 square inch. An increasing load was applied perpendicular to the brass cylinder at a constant rate until the adhesive bond was broken. The load at the time the bond was broken was measured and expressed as tensile strength in pounds per square inch, reported in the table below. The adhesive thickness for each determination was 6 mils. The identity and presence of any tackifying agents and the presence or absence of pitch in each composition is indicated in the table below:

COMPOSITION

| Test No. | Tackifying Resin and/or Pitch | Wt. Percent | Tensile Strength, p.s.i. |
| --- | --- | --- | --- |
| 1 | Pitch | 20 | 32 |
| 2 | Staybelite ester 10 | 20 | 30.5 |
| 3 | Pitch | 7 | 33 |
|   | Staybelite Ester 10 | 13 |   |
| 4 | Piccoflex 105 | 20 | 22 |
| 5 | Pitch | 7 | 29 |
|   | Piccoflex 105 | 13 |   |

Althougth pitch is not considered as a tackifying resin, it is apparent from the foregoing that pitch alone gives excellent tensile strength to compositions of this invention. Additionally, the pitch appears to coact with other tackifying resins in providing even more improvement in tensile strength.

Although I have discussed my invention herein with particular reference to one specific embodiment thereof, it is to be understood that I do not intend to be limited to such embodiment. My invention is described in the appended claims.

All percents and parts given herein are percents and parts by weight.

I claim:
1. A pressure sensitive adhesive composition consisting essentially of a major amount of chlorinated biphenyl, and minor amounts of high molecular weight chlorinated rubber, pitch having a softening point in the range of 130 to 200° F., and a tackifying resin having a cyclic hydrocarbon structure.
2. The adhesive composition of claim 1 wherein said tackifying agent is selected from the class consisting of terpene resin, a glycerin ester of hydrogenated rosin, and a polycyclic hydrocarbon obtained from the high temperature cracking of petroleum.
3. An adhesive composition consisting of three parts by weight chlorinated biphenyl, one part by weight of high molecular weight chlorinated rubber and one part by weight pitch having a softening point of 160° F.
4. A water-proof, corrosion-resistant, pressure-sensitive adhesive composition for adhering to the exterior surface of a pipe, which composition comprises a major amount of chlorinated biphenyl and minor amounts of chlorinated rubber and pitch.
5. The composition of claim 4 including a minor amount of tackifying resin.
6. The composition of claim 5 wherein said tackifying resin is characterized by a cyclic hydrocarbon structure.
7. The composition of claim 4 wherein said major amount is 60 percent by weight.

References Cited
UNITED STATES PATENTS

| | | | |
|---|---|---|---|
| 1,950,894 | 3/1934 | Koch | 260—3.3 |
| 2,987,337 | 7/1937 | Tomsicek et al. | 260—3.3 |
| 2,096,660 | 10/1937 | Winbelmann | 260—3.3 |
| 2,140,835 | 12/1938 | Gebauer-Fuelnegg | 260—3.3 |
| 2,142,039 | 12/1938 | Abrams et al. | 260—737 X |
| 2,370,386 | 2/1945 | Anderson et al. | 106—273 |
| 2,976,256 | 3/1961 | Whittier et al. | 161—236 X |
| 2,999,769 | 9/1961 | Korpman | 117—122 |
| 3,034,939 | 5/1962 | Newkirk et al. | 156—333 X |
| 3,211,598 | 10/1965 | O'Brien | 156—244 X |

OTHER REFERENCES

Barron, Modern Rubber Chemistry (1948), p. 67.

EARL M. BERGERT, *Primary Examiner.*

T. R. SAVOIE, *Assistant Examiner.*